Figure 1:
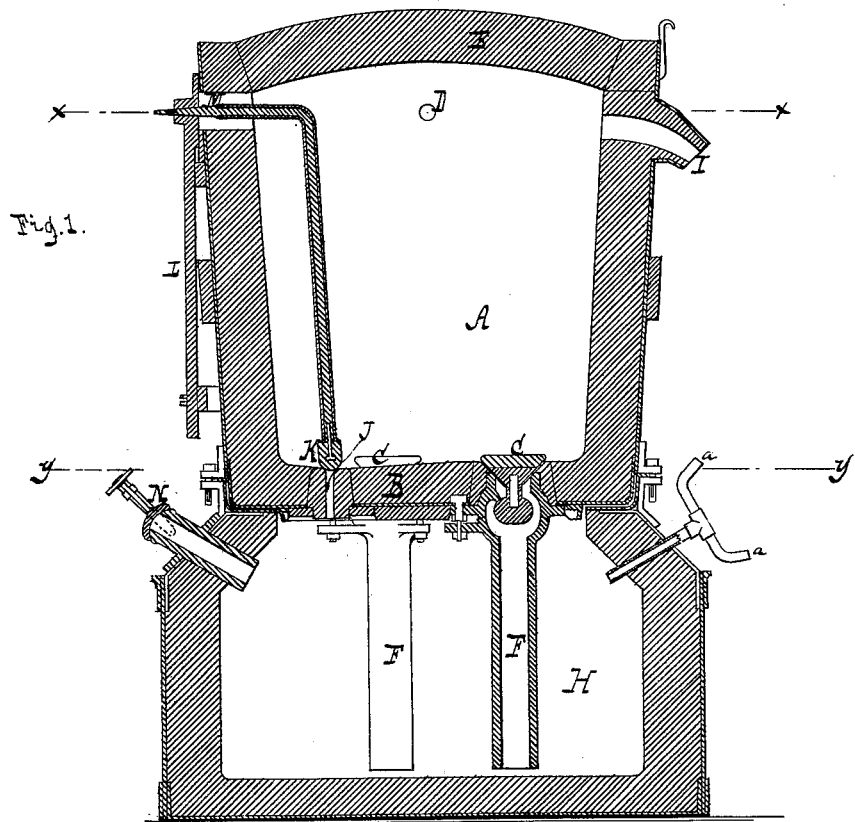

H. SCHULZE-BERGE & J. BARNSTORF.
Freeing Molten Iron from Phosphorus.

No. 208,561. Patented Oct. 1, 1878.

Witnesses
Otto Aufeland
W. C. Hauff

Inventors.
Hermann Schulze-Berge.
Julius Barnstorf.
by Van Santvoord & Hauff
his attorneys.

UNITED STATES PATENT OFFICE.

HERMANN SCHULZE-BERGE AND JULIUS BARNSTORF, OF OBERHAUSEN, PRUSSIA.

IMPROVEMENT IN FREEING MOLTEN IRON FROM PHOSPHORUS.

Specification forming part of Letters Patent No. 208,561, dated October 1, 1878; application filed July 17, 1878.

*To all whom it may concern:*

Be it known that we, HERMANN SCHULZE-BERGE and JULIUS BARNSTORF, of Oberhausen, Prussia, have invented Improvements in the Means and Methods of Extracting Phosphorus from Fluid Iron, Steel, and other similar metals, of which the following is a specification:

Our invention consists in a process of freeing iron or steel from phosphorus and other impurities by introducing into the iron or steel, while in a fluid state and while excluded from oxidizing agents, chloride of calcium or other haloid salts of an alkaline earthy nature, as will be hereinafter particularly explained.

As is well known, phosphorus may be separated from its combinations with metals by the action of alkaline earthy metals. Dr. Schönn, of Stettin, has utilized this property for the qualitative analysis of phosphorus, and Dr. Tresenius, in his journal of analytical chemistry, year 1869, page 53, has especially recommended the use of magnesium. His communications leave no doubt that iron, even at a red heat, is freed from its phosphuret through the agency of alkaline earthy metals. Furthermore, what is known concerning the greater affinity of the alkiline earthy metals for phosphorus compared with that of the heavy metals leads to the belief that it is not absolutely necessary to use the simple bodies, as barium, strontium, calcium, or magnesium, but that the chlorides of these bodies may be employed with equal advantage. That such is the case has been ascertained by us in the course of numerous carefully-conducted experiments. The iron is separated by the action of an alkaline earthy chloride, whereby protochloride of iron and an alkaline earthy phosphuret are formed. This double decomposition is easily verified by heating a mixture of phosphuret of iron and of anhydrous chloride of calcium to a red heat until the fusion of the chloride takes place, care being taken to exclude the air; or, the mixture may also be heated in an atmosphere or current of nitrogen. The following experiment also further demonstrates this same reaction: A certain quantity of molten pig-iron containing phosphorus is placed in an iron test-tube or testing-vessel having an inner polished metallic surface. This tube or vessel is then inverted over a metal bath, the mouth of said tube or vessel being under the surface of the bath. A piece of pure chloride of calcium is then introduced into the tube or vessel through the metal bath, through which it rises up to the level of the bath in the interior of the test-tube, since it is of lighter gravity than the metal bath. After the iron has cooled there is found, in addition to the chloride of calcium which has not been decomposed, protochloride of iron and phosphuret of calcium.

The bromides, iodides, and cyanides of the alkaline earthy metals may be used in the dephosphorization of iron as well as the chlorides; but if the iron should also contain silicium, the fluorides are preferable, since in this case volatile fluoride of silicium is formed as well as alkaline earthy phosphuret. In the operation of dephosphorization, the silicium, as well as any sulphur which may be present, is also eliminated along with the phosphorus, while the carbon remains in the iron.

Our new process for dephosphorizing molten iron, whether pig-iron, ingot metals, as Bessemer and Martin steel, or malleable iron, depends on these properties of the haloid salts of alkaline earthy metals, among which the chlorides and fluorides are specially recommendable on account of their cheapness. About the best mixture is chloride of calcium with a small amount of chloride of barium and fluoride of calcium. In this connection it should also be mentioned that haloid salts of the alkaline metals, of the earthy metals, or of the heavy metals, liquefied in presence of molten iron, do not show any dephosphorizing action. They may, however, be employed, if required to give, by their presence, greater fusibility to the haloid salts of the alkaline earthy metals.

In carrying out this process we make use of the following apparatus, illustrated in the drawing, in which—

Figure 2:
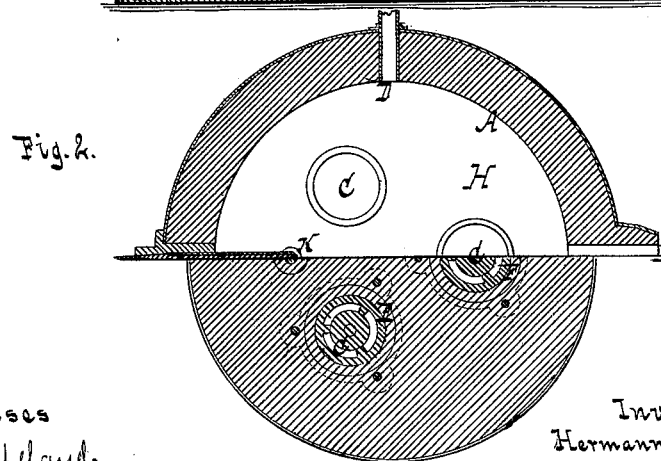

Figure 1 is a vertical central section. Fig. 2 is a horizontal section, partly in the plane $x$ $x$ and partly in the plane $y$ $y$.

Similar letters indicate corresponding parts.

The letter A indicates a fixed or movable crucible or ladle, which is intended to receive the molten iron. This crucible is lined in its interior with any refractory covering material which is best adapted to resist the action of the products of decomposition or of the haloid salts. Lime, magnesia, graphite, coke, or other similar bodies, bound with clay, are suitable for this purpose. The bottom B of said crucible is also covered with a refractory material like that which lines the inner walls of the crucible A.

C C C represent valves, of which there may be any desired number. These valves close the mouths of the tubes F, which lead from the lower crucible or chamber, H, into the crucible A; and if the pressure in the crucible A should be greater than in the lower crucible, H, the valves C are closed, and these valves are open if the pressure is in the opposite direction. Instead of automatic valves, other valves or plugs operated from the outside could be substituted. These valves allow the dephosphorizing agent or agents in the chamber H to flow into the crucible A, and the number and arrangement of these valves are regulated by requirements. The drawing shows three valves, each of which is fastened by three screws, so that they can be readily removed.

The letter D represents an opening which permits the dephosphorizing agents, together with phosphureted, sulphureted, or silicated calcium, to run off, since these bodies rise to the surface of the molten iron, being of lighter specific gravity. This opening connects with a suitable reservoir, into which these products of decomposition, whether liquid or volatile, are carried. A lid, E, prevents the radiation of heat from the molten iron, and also allows the space above said iron to be filled with gases which do not contain oxygen or oxidizing agents, and hence prevent the oxidation of the alkaline earthy metals. These gases, as, for example, any hydrocarbon gas, are introduced into the crucible A at the beginning of the operation through a conduit, I, and these gases may afterward be wholly or partially replaced by the steam or vapor coming from the ferruginous haloid salts which are formed. When the action is completed—that is, when the iron is dephosphorized—the iron is allowed to flow out through an opening, J, and is then cast into pigs. This opening J is closed by a plug, K, operated by a slide, L, or any other suitable means. The opening M in the side of the crucible A, through which the slide L operates the plug K, is closed as tightly as possible by a sliding plate, or by any other suitable means.

The lower crucible, H, serves to receive the purifying agents, and is also lined with refractory materials, similar to those used to line the crucible A. The haloid salts are first fused, so that they will abstract no heat from the molten iron in the crucible A. Then, by means of a tube or tubes, N, these salts are introduced into the crucible H, which is kept at a red heat. The tubes $a\ a$ serve for the introduction of the gas, which, by its pressure, is to force the haloid salts through the tubes F, which tubes reach nearly to the bottom of the crucible H into the crucible A. According to the number of valves C, the haloid salts permeate the molten iron more or less thoroughly. Of course any other means may be employed to cause the haloid salts to permeate the molten iron, the chief object being to cause the salts to act on every part of the iron. The tubes F are also covered and lined with refractory material, and may be provided at their lower ends with valves which can be operated from the outside, so that in case the valves C get out of order the iron will not run down into the lower crucible, H. Of course we do not limit ourselves to this precise construction of furnace, but may employ any furnace which combines the advantages of the one described, which are: that of preventing, as far as possible, the heat from radiating from the molten iron, and of preventing any contact with air or other oxydizer; that of allowing the fused haloid salts with an alkaline earthy base to permeate the iron in the most divided state possible, or else allowing these salts to be intimately mixed with the molten iron. The haloid salts can also be fed in through the top of the crucible A, through tubes reaching nearly to the bottom of the crucible A, thus making valves unnecessary. A rotary puddle-furnace can also be employed to intermingle the haloid salts and molten iron. The only necessity in all cases is to exclude air or oxidizing agents.

It is necessary in the operation to exclude any oxidizing agent, as the oxidization of the phosphurets of the earthy metals renders the final elimination of the phosphorus from the iron impossible, inasmuch as, by the combination of the phosphorets with oxygen, phosphates, hypophosphates, and phosphites are formed, which will be reduced by the fluid iron, the phosphorus combining with the iron, liberating the earthy metal in the form of an oxide, which remains in the slag, thus defeating the object of the invention.

Furthermore, silicic acid acts very disadvantageously, because, when the fluorides of the alkaline earths are used, the silicium volatilizes as fluoride of silicium, and the oxygen of the silicic acid oxidizes the alkaline earthy metals which are liberated, and so destroys the efficiency of a great mass of the dephosphorizing agents. Therefore, the slag of the iron must be removed as carefully as possible in order to avoid this action of the silicic acid.

The heat of the slag which is removed from the molten iron can be employed for fusing the dephosphorizing agents, since, as already stated, these salts must be hot when introduced into the crucible H, so as not to cool off the molten iron in the crucible A. We have devised an apparatus for melting the dephosphorizing agents by the heat of the molten slag. This apparatus, however, will form the subject of a separate patent; and we do not, therefore, give a detailed description of the same.

To recover the haloid salts of the alkaline earthy metals, with the exception of the fluorides and cyanides, after they have passed through and dephosphorized the iron, we mix, in equivalent proportions, the haloid salts of iron which have been formed in the process of dephosphorization with alkaline earthy carbonates, ground or pulverized, or with alkaline earths. Thus protochloride of iron is mixed with carbonate of lime, for example, and left exposed to the air. The protochloride of iron then changes into oxide and perchloride of iron. This latter is also, by means of carbonate of lime or burned lime, transformed into oxide, with a simultaneous formation of chloride of calcium, and if the decomposed mass is then lixiviated the chloride of calcium and oxide of iron are obtained separate. This action is accelerated by currents of hot air.

If chloride of calcium has been employed as the reagent, that portion of the chloride which passes through the molten iron without being decomposed, and which becomes mingled with phosphoret, silicide, and sulphide of calcium, after having cooled is sprinkled with water. In consequence thereof the phosphoret of calcium is partly transformed into hypophosphite and phosphite of lime, and partly into phosphoreted hydrogen. The latter passes off while the former remains undissolved; but the chloride of calcium is dissolved, and after the same has been separated from the residuum it can be recovered by evaporation to dryness. A portion of the phosphorus, however, would be lost, since the same escapes in the form of phosphoreted hydrogen. If, in consequence of the presence of the soluble haloid salts, this compound should form only in a small quantity, the loss is of no consequence; otherwise the sprinkling with water must be done in a closed vessel, and the phosphoreted hydrogen must be carried off by pipes. It is then easy to recover the phosphoret from the phosphoreted hydrogen in a useful form. For instance, by the introduction of atmospheric air it can be transformed into phosphoric acid, and by the introduction of chlorine it can be transformed into a chloride of phosphorus.

A short calculation of the probable consumption of chloride of calcium, assuming it alone to be employed in the process of dephosphorization, is given below. We assume that the iron is forge-pig, and contains 1.5 per cent. of phosphorus, 0.5 per cent. of silicium, and 0.3 per cent. of sulphur, and that the mass of chloride of calcium required must be quadrupled in order to obtain complete dephosphorization.

One thousand kilograms of forge-pig contain fifteen kilograms of phosphorus, five kilograms of silicium, and three kilograms of sulphur. According to the formula $Ca_2P_2$, fifteen kilograms of phosphorus require 53.7 kilograms of chloride of calcium, which decompose into 34.4 kilograms of phosphuret of calcium and 61.5 of protochloride of iron. Five kilograms of silicium require, according to the formula $Ca_2Si$, 39.6 kilograms of chloride of calcium, which decompose into 19.3 kilograms of silicide of calcium and in 45.4 of protochloride of iron. Three kilograms of sulphur require, according to the formula $Ca\,S$, 10.4 kilograms of chloride of calcium, which decompose in 6.75 kilograms of sulphuret of calcium and in 11.9 of protochloride of iron. The decomposition of at least 103.7 kilograms is therefore required to liberate these one thousand kilograms of forge-pig from its phosphorus, silicium, and sulphur.

Four times the amount above computed, or 414.8 kilograms of chloride of calcium, will be abundantly sufficient to dephosphorize the iron, since experiments on a small scale have shown us that two and one-half times the quantity, or 259.25 kilograms of chloride of calcium, accomplish the desired result.

According to our first hypothesis, three-fourths of the 414.8 kilograms would pass through the mass of fluid iron without being decomposed. If we admit that five per cent. is lost in the operation of recovery, we arrive at 295.5 kilograms, with 15.6 kilograms of loss. Theoretically, the 118.8 kilograms of protochloride of iron produced should yield by recuperation exactly one-fourth; but there always occurs some loss in practice, and if we assume the loss as being ten per cent., we arrive at 93.32, with a loss of 10.4 kilograms of chloride of calcium. Hence, for one thousand kilograms of forge-pig containing 1.5 per cent. of phosphorus, 0.5 per cent. of silicium, and 0.3 per cent. of sulphur, the loss by our process, taking the most unfavorable view, is only twenty-six kilograms of chloride of calcium.

The 34.4 kilograms of phosphuret of calcium produced, containing fifteen kilograms of phosphorus, may give 34.4 kilograms of phosphoric acid or seventy-five kilograms of phosphate of lime, and from the 118.8 kilograms of protochloride of iron we get 74.8 kilograms of oxide of iron.

The value of these secondary products is not insignificant, and may sensibly diminish the cost of our process of dephosphorization.

An important consumption of chloride of calcium results from the separation of the silicium, and it is evident that still more favorable results may be obtained by the use of a slight percentage of fluoride of calcium, because the fluorine contained in this latter volatilizes the silicium, while at the same time the calcium decomposes the phosphuret of iron.

In our process it is of great importance that the carbon contained in the iron be preserved, since only by this means is it possible to free the fluid iron or steel from phosphorus.

What we claim as new, and desire to secure by Letters Patent, is—

The within described process of freeing iron or steel from phosphorus and other impurities by introducing into the iron or steel, while in a fluid state, and while excluded from oxidizing agents, chloride of calcium or other haloid salts of an alkaline earthy nature, substantially as set forth.

In witness whereof we, HERMANN SCHULZE-BERGE and JULIUS BARNSTORF, have hereunto set our hands this 31st day of May, in the year of our Lord one thousand eight hundred and seventy-eight.

HERMANN SCHULZE-BERGE.
    JULIUS BARNSTORF.

Witnesses:
    HERMANN POTHMANN,
    W. HESIGMANN.